UNITED STATES PATENT OFFICE.

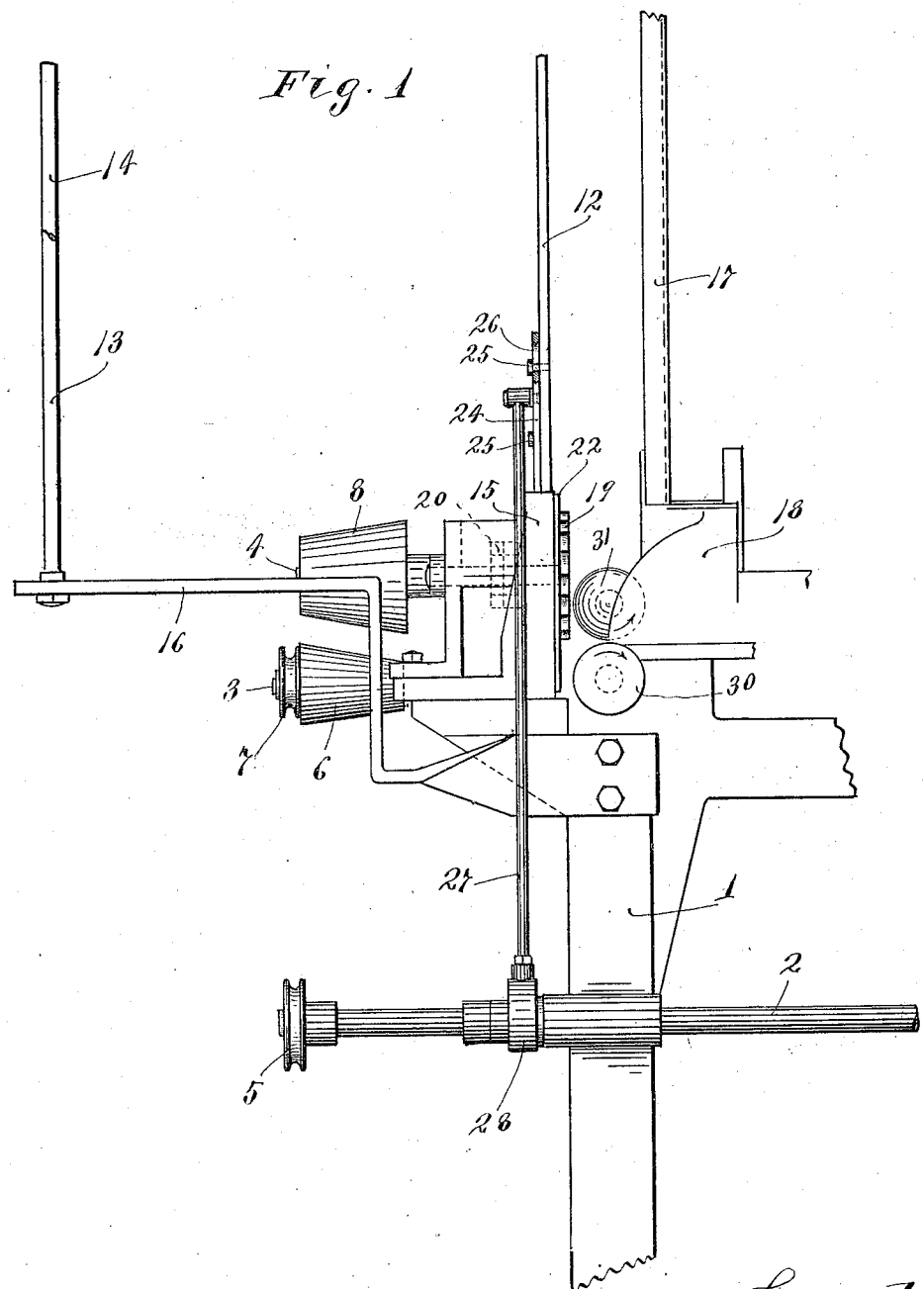

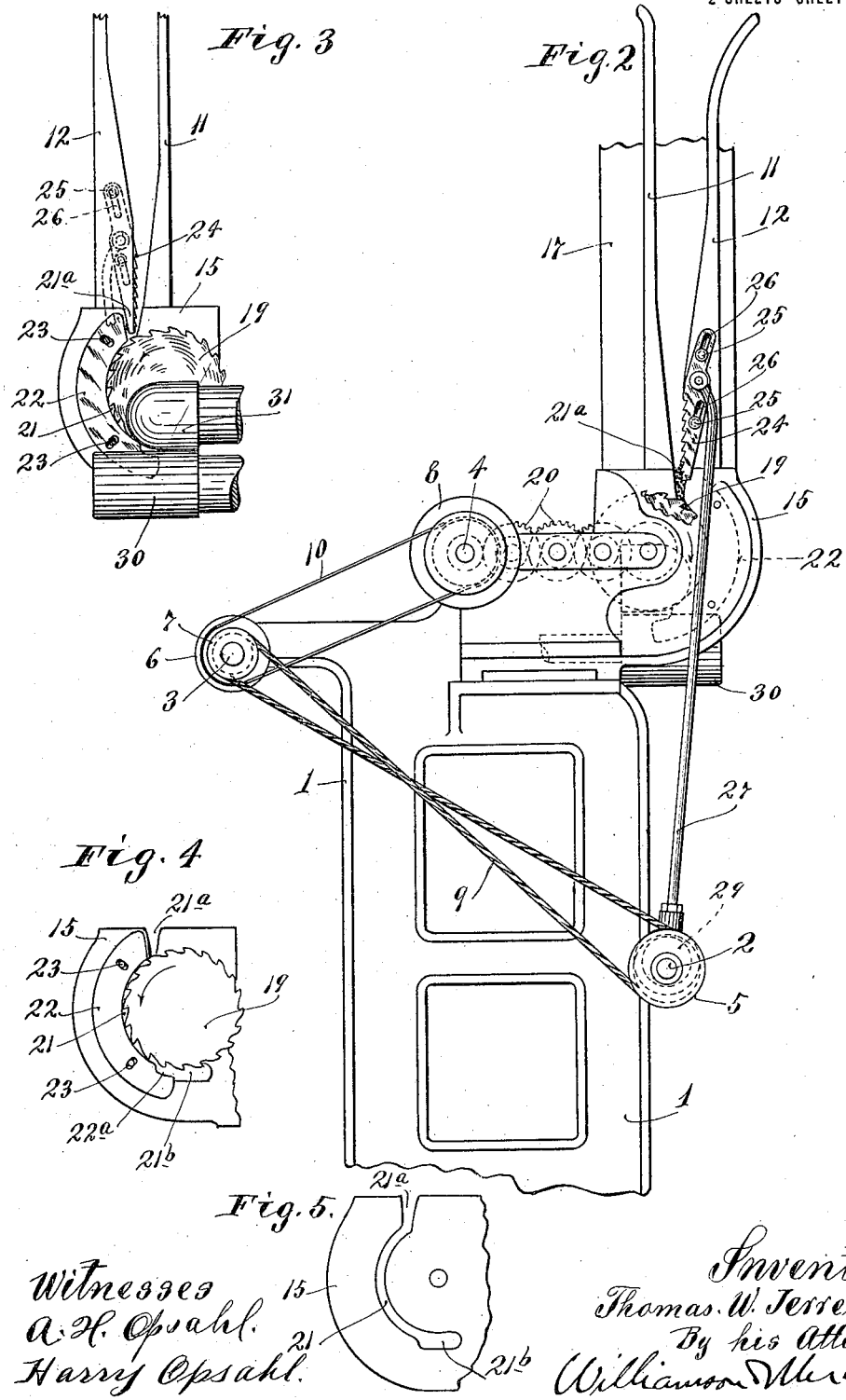

THOMAS W. JERREMS, OF ST. PAUL, MINNESOTA, ASSIGNOR OF ONE-HALF TO EMIL H. STEIGER, OF OSHKOSH, WISCONSIN.

GRASS-FEEDING MECHANISM FOR GRASS-TWINE MACHINES.

1,298,730.     Specification of Letters Patent.     Patented Apr. 1, 1919.

Application filed January 6, 1911. Serial No. 601,097.

*To all whom it may concern:*

Be it known that I, THOMAS W. JERREMS, a citizen of the United States, residing at St. Paul, in the county of Ramsey and State of Minnesota, have invented certain new and useful Improvements in Grass - Feeding Mechanism for Grass-Twine Machines; and I do hereby declare the following to be a full, clear, and exact description of the invention, such as will enable others skilled in the art to which it appertains to make and use the same.

My present invention has for its object to provide an improved grass feeding mechanism for grass twine machines. The present invention is in the nature of a modification of or an improvement on the grass feeding mechanism disclosed and broadly claimed in my Patent 1,023,081, of April 9, 1912, and from the broad point of view, the invention herein disclosed is within the scope of the broad or generic claim one of my prior Patent 745,625 of date December 1st, 1903.

Generally stated, the invention consists of the novel devices and combinations of devices hereinafter described and defined in the claims.

In the accompanying drawings which illustrate the invention, like characters indicate like parts throughout the several views. Referring to the drawings, Figure 1 is a view in side elevation, with some parts broken away, showing the improved grass feeding mechanism and the front end portion of the machine to which it is applied;

Fig. 2 is a front elevation of the parts shown in Fig. 1, some parts being broken away;

Fig. 3 is a detail view in rear elevation, with parts broken away, showing the so-called primary grass feeding device and coöperating rollers which constitute the so-called secondary feeding device;

Fig. 4 is a view corresponding to Fig. 3, but with the rollers and certain other parts removed; and Fig. 5 is a detail showing a portion of the feed head in rear elevation with the adjustable throat plate removed therefrom to expose the feed throat and the releasing notch thereof.

The framework of the grass twine machine is indicated as an entirety by the numeral 1, and journaled in suitable bearings thereon is a driving shaft 2 and countershafts 3 and 4. The driving shaft 2 is shown as provided with a grooved pulley 5; the countershaft 3 is shown as provided with a cone pulley 6 and a grooved pulley 7; and the countershaft 4 is shown as provided with a cone pulley 8. A crossed belt 9 runs over the pulleys 5 and 7 and transmits motion from the shaft 2 to the shaft 3. A belt 10 runs over the cone pulleys 6 and 8 and transmits motion from the shaft 3 to the shaft 4. These driving connections are illustrative only and, so far as my invention is concerned, may take various forms.

*Grass holder.*

To hold the grass in a straight parallel arrangement, a suitable grass holder is provided and this is preferably made up of a pair of inner upright bars 11 and 12 and a pair of outer upright bars 13 and 14. The bars 11 and 12 converge toward their lower ends and, as shown, are rigidly secured to a bifurcated bearing bracket 15 rigidly secured to the upper front portion of the frame 1. The outer bars 13 and 14 are, as shown, rigidly secured at their lower ends to a bracket 16 projecting forward from and rigidly secured to the frame 1.

The wire grass after having been properly combed, and its stems evened up at their butt ends, is placed in the grass holder made up of the properly spaced upright rods or bars marked with the numerals 11 and 12, and 13 and 14, with the butt ends of the grass stems abutting against the upright butter board 17 which, as shown, is fixed to and rises from the bracket 18 of the main frame 1.

*Grass feeding mechanism.*

The grass feeding mechanism may be treated as made up of a primary grass feeding device and a secondary grass feeding device.

The primary grass feeding devices include a feeding head or casting 15 fixed to the main frame of the machine in any suitable way, and having formed therein a segmental feed throat 21 with a V-shaped mouth 21$^a$, from the opposite walls of which rise the crotch rods 11 and 12 that support the butt ends of the grass stems. The said feed throat 21 is provided at its lowermost portion with an enlargement 21$^b$ (shown best in Figs. 4 and 5) which affords a clearance notch or space through which the grass stems can be drawn by the secondary feed devices lengthwise of the stems, after the stems are released by the primary feed devices. In the feed head 15 is suitably journaled a toothed rotary feed disk 19 with the face of the disk projecting from the rear face of the said head, but directly adjacent thereto as best shown in Figs. 3 and 4. This notched disk 19 is rotated in a continuous direction through a train of gears 20, receiving motion from the counter shaft 4. The said disk 19 is so mounted on the head 15 that its serrated edge is coincident with the segmental portion of the feed throat 21.

The arc of the feed throat 21 is struck from a little longer radius than the periphery of the toothed disk 19, and this feed throat 21 is of sufficient cross section to permit the wisps of grass to be freely moved downward therein, under the action of the said disk 19; and, in order to be able to gage this feed throat 21 for best adapting the disk to operate on various kinds and conditions of wire grass, the feed head 15 is fitted with a segmental adjustable throat plate 22 connected thereto by slot and screw connections 23 and adapted to be fixed thereto in any desired adjustment by means of said screws 23. Hence, by adjusting the segmental plate 22 radially in relation to the disk 19, the passageway for the grass stems in the feed throat 21 can be made of any desired cross section. Or otherwise stated, the teeth of the disk 19 may be made to travel closer to or farther away from the throat plate 22 as may be desired for the best action of the disk on the grass being handled for making twine of the desired thickness or cross section. The adjustable throat plate 22 is of less length than the curved portion of the feed throat 21 and, as shown in Fig. 4, it is cut away or reduced at its lower end for cooperation with the releasing space or notch 21$^b$ in the feed throat, or directly below the disk 19 when at the lowest point in the arc of its travel.

The numeral 24 represents an auxiliary feed device shown as in the form of a small flat bar with ratchet-like teeth on its inner edge and provided with oblique slots 26 which are engaged by headed set screws or studs 25 seated in the crotch rod 12. Said feed bar 24 is pivoted to the upper end of the eccentric rod 27 having, at its lower end, a strap 28 which works on the eccentric 29 fixed to the rotary shaft 2. The said feed bar 24 is so positioned in respect to the mouth of the feed throat 21 in the feed head 15 and the holding crotch for the butt ends of the grass stems afforded by the upright rods or bars 11 and 12, that it will engage with the grass in the grass holder and coöperate with the rotary disk 19 in the selecting and the feeding action. The slots 26 are so shaped and the studs 25 so positioned that, under the up and down motion imparted to said feed bar 24 by the eccentric driven rod 27, the feed bar 24 will have an inward and outward motion in respect to the center of the feed crotch and the mouth of the feed throat 21$^a$ in the feed head 15. Otherwise stated, on the downward motion of the feed bar 24, its toothed edge moves inward as well as downward, thereby engaging with the stems of grass and forcing the same downward into the mouth of the feed throat; while on the upward motion of the feed bar 24 it retreats outward, thus freeing itself from the stems of grass which it had fed downward, and clearing the body of grass in the holder.

It should be noted that the said toothed feed bar 24 moves up and down on straight lines; but the center line of its vibration is oblique, and, when produced, crosses the feed throat near the same place that the teeth of the rotary disk 19 cross that feed throat. Otherwise stated, the toothed feed bar 24 lies out of alinement with the feed throat. It should also be noted that the rotary feed disk 19 and the right-line-reciprocating toothed feed bar 24 work in opposition to each other; or, in other words, they respectively engage with the grass in the feed throat from opposite sides thereof.

The so-called secondary feed device, which receives the grass blades laterally from the notched disk or wheel 19 from the primary feed device and feed the same endwise to the twine forming mechanism not shown, may take various forms, but, as shown, is in the form of a pair of horizontally disposed coöperating reversely driven feed rollers 30 and 31, the former of which is longer than the latter, and the latter of which is provided with a tapered or rounded end. These rollers 28 and 29 are so located that the butt ends of the grass blades will be fed laterally to the converging surfaces of the two rollers by the feed wheel 19 and will be engaged by the said rollers and feed endwise immediately after the said grass blades are delivered into the clearance spaces 21$^b$ and 22$^a$ of the throat plates 21 and 22.

Any suitable means, not shown, may be provided for driving said rollers 30 and 31, and the direction of the rotation thereof is indicated by the arrows marked thereon in Fig. 1. The direction of the rotation of the feed disk or wheel 19 is indicated by the arrows marked thereon in Figs. 3 and 4.

Obviously, when the machine is in operation, the feed disk or wheel 19 will be continuously rotated in the direction already stated and the auxiliary feed bar 24 will be reciprocated with a peculiar movement already described, to-wit, with an upward receding movement from the grass blades and with a downward movement into closer engagement with the grass blades. Under this action of the auxiliary feed bar, the grass blades will be kept worked to the bottom of the grass holder, will thereby be prevented from clogging at the bottom of the grass holder and will be kept crowded downward into engagement with the notched periphery of the feed wheel 19. It, therefore, follows that each notch of the feed wheel 19, as it passes the bottom of the grass holder, will be completely filled with grass blades and the grass blades will be selected from the bottom of the holder and delivered therefrom in an even order of succession to the secondary feed device, which secondary feed device in the machine illustrated is made up of the rollers 30 and 31.

Extensive commercial usage has proven that the primary grass feeding mechanism, herein disclosed can be relied upon to make the proper selections of the wisps of grass in the desired uniform quantities and to feed the same laterally downward and into the bite of the said secondary feed rollers 30 and 31 in the necessary uniform order of succession, or sequence of time, to get the wisps of grass overlapped in respect to each other, as required for making grass twine suitable for use in the manufacture of grass rugs, notwithstanding the variety in the kinds and conditions of the wire grass which must be handled for that purpose. Otherwise, and briefly stated, wire grass seems to be of several different varieties; some have round stems, others have flat stems, and still others have stems which are three-cornered. This wire grass also varies greatly according to the conditions of its growth, the time when it is harvested, the way in which it is cured, and the ways in which it is subsequently handled. If the grass is harvested at the right time, and cured and handled in the right way, the stems will be comparatively fine, smooth and tough, and they will make the best quality of twine and rugs; but, if the grass be harvested too late, the fiber will be different, the stems will be comparatively large, coarse, woody, rough and brittle and such grass will not make such good twine, or such good rugs. Notwithstanding this great diversity in the kinds and conditions of the wire grass, it must be fed to the spinning mechanisms in bunches or wisps of several stems at a time, varying according to the character of the stock and the thickness of twine desired, and these bunches or wisps must be of the same size and be selected and fed in a substantially uniform order, or sequence of time; or otherwise no twine at all or not twine fit to use for rugs can be made.

The combinations of devices, herein disclosed, will do the work reliably, under all this great diversity of kinds and conditions of the grass. Otherwise stated, it will take the factory run of grass as it comes and will make the required selections, and properly feed the same to get a uniform size of twine.

The rotary toothed disk, alone, cannot be relied upon to do the work. The wire grass, under some conditions, will lodge in the grass holder or in the mouth of the feed throat and, in that case, the teeth of the disk would not get any bite at all or would not get a full bite of the grass. Either case would be fatal to the twine. With the auxiliary feed bar 24 present, however, working as described, the grass will always be kept in contact with the disk in sufficient quantities to insure the teeth of the disk getting their full bite of grass. In other words, there is a very close coöperation between the feed bar 24 and the notched disk 19 for insuring the proper selections and the proper feed of the wisps of grass.

What I claim is:

1. A primary grass feeding machanism for grass twine machines, comprising the combination with a grass holder, of a feeding head having a segmental feed throat with a V-shaped mouth, a toothed rotary disk traversing the mouth of said feed throat, and a toothed auxiliary bar having an up and down and in and out motion in said grass holder and the mouth of said feed throat, said auxiliary feed bar being constructed and arranged to engage the stems of grass at one point only and to coöperate with said notched disk to feed the stems of grass substantially as described.

2. The combination with an upright grass holder, of a peripherally notched feed wheel arranged to receive the grass blades laterally from the bottom of said holder, means for rotating said feed wheel in a constant direction, a vibratory toothed auxiliary feed bar working at one side of the lower portion of said holder and having oblique supporting connections, whereby it will recede from the grass blades, when moved upward, and will move into engagement with the grass blades, when moved downward.

3. The combination with an upright grass holder, of a peripherally notched feed wheel arranged to receive the grass blades laterally from the bottom of said holder, means for rotating said feed wheel in a constant direction, a toothed auxiliary feed bar working at one side of the lower portion of said holder and supported for oblique movements in respect to the holder, by means of slot and pin connections, as and for the purposes stated, a rotating shaft having an eccentric, and an eccentric rod connected to said auxiliary feed bar for vibrating the same, and subject to said eccentric.

4. In a grass twine machine, the combination of a holder for grasses having a throated outlet, a rectilinearly moving vibrating member lying out of alinement with said opening for pressing said grasses downward in the holder and into said outlet, and means operatively connected for operating said member, substantially as described.

5. In a grass twine machine, the combination of a holder for the grasses having a throated outlet, a rectilinearly-moving oscillating member for pressing said grasses downward in the holder and into said outlet, said member extending obliquely to the grasses within the holder and to said outlet, and means operatively connected for actuating said member, substantially as described.

6. In a grass twine machine, the combination of a holder for grasses having a throated outlet, means for conveying the ends of the grasses out of said outlet, a rectilinearly-moving oscillating member for pressing said grasses downward in the holder and into said outlet, said member operating in a line oblique to said outlet and approximately parallel to the initiatory line of movement of the grasses out of the holder, and means operatively connected for actuating said member, substantially as described.

7. In a grass twine machine, the combination of a holder for the grasses having a throated outlet, a plate-like member terminating in a flat-face lying obliquely to said outlet, and adapted to engage the grasses and press them downward in the holder and into said outlet, a guide for said presser member, and mechanism operatively connected for actuating said member with a rectilinearly vibrating movement, substantially as described.

In testimony whereof I affix my signature in presence of two witnesses.

THOMAS W. JERREMS.

Witnesses:
BERNICE G. WHEELER,
HARRY D. KILGORE.

Copies of this patent may be obtained for five cents each, by addressing the "Commissioner of Patents, Washington, D. C."